United States Patent

Nasser

[15] 3,697,591
[45] Oct. 10, 1972

[54] TURBULENT FLOW LEACHING

[72] Inventor: John Nasser, New Canaan, Conn.
[73] Assignee: Mobil Oil Corporation
[22] Filed: Sept. 1, 1966
[21] Appl. No.: 576,764

[52] U.S. Cl. .................................................. 260/525
[51] Int. Cl. .............................................. C07c 63/26
[58] Field of Search ..................................... 260/525

[56] References Cited

UNITED STATES PATENTS

3,364,256  1/1968  Ichikawa et al. ............ 260/525
3,171,856  3/1965  Kurtz ......................... 260/525

OTHER PUBLICATIONS

Perry, Chem. Engineers' Handbook, 1955, pp. 717, 718, and 747.

Treybal, Mass Transfer Operations, 1955, p. 607.

Primary Examiner—Lorraine A. Weinberger
Assistant Examiner—R. Weissberg
Attorney—Oswald G. Hayes et al.

[57] ABSTRACT

Rapid and efficient preheating and leaching of a suspension of an impure solid material in a liquid solvent capable of dissolving free or released impurities and only a portion of the desired product at high temperatures, as exemplified by a suspension in acetic acid at 400°–580° F. of crude terephthalic acid contaminated with p-carboxybenzaldehyde and p-toluic acid, while maintaining turbulent flow in pipes to prevent the settling or plating of solid deposits therein. Disposing the piping horizontally or at an angle less than the angle of repose of the solid material permits the leaching system to be shut down and started up without plugging and without cleaning the piping.

10 Claims, 1 Drawing Figure

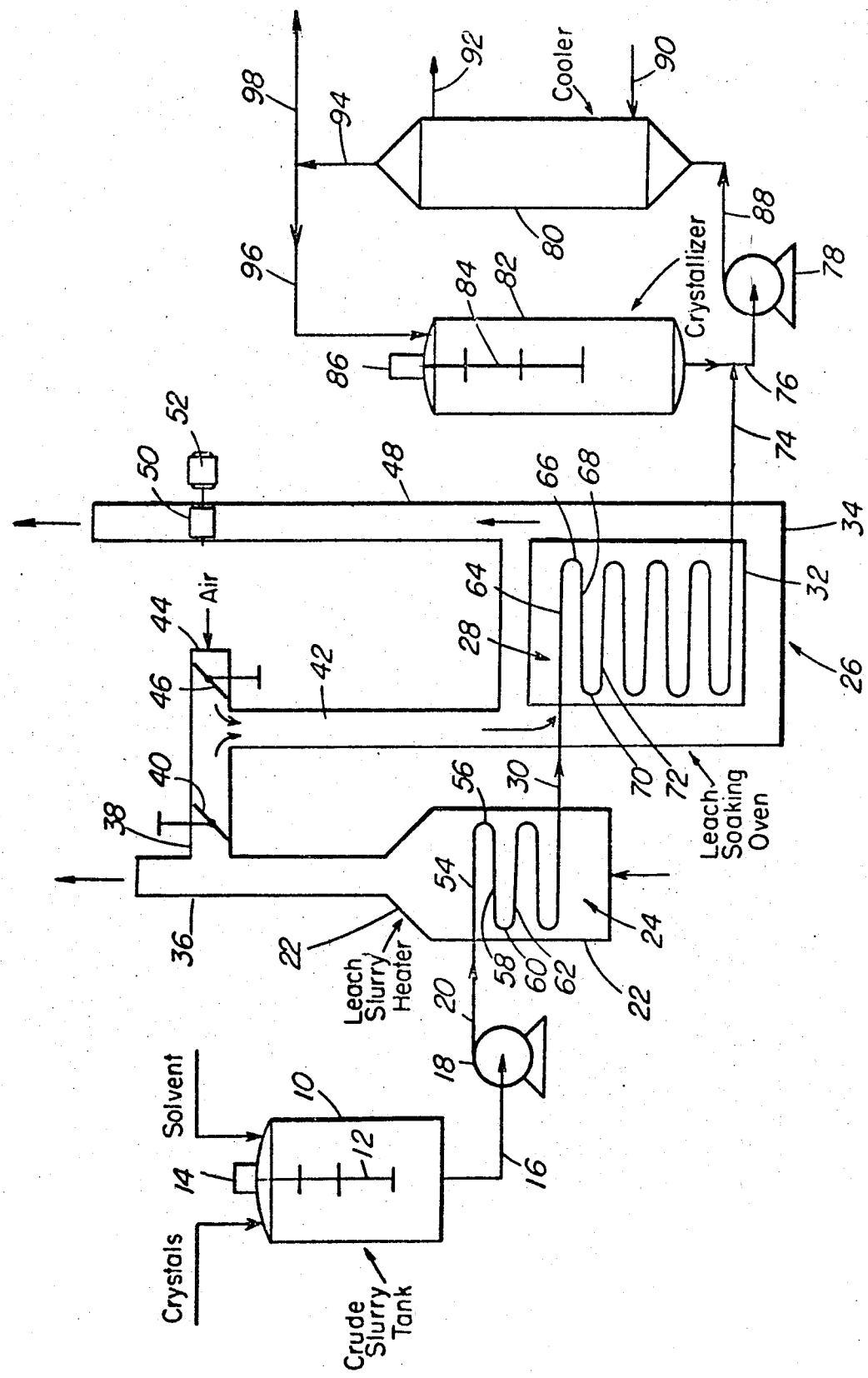

TURBULENT FLOW LEACHING

This invention relates to a purification process for continuously leaching a slurry or suspension of small particles of an impure solid material in turbulent flow in a confined channel. In one particular embodiment, it is concerned with the treatment of crude terephthalic acid with acetic acid as the leaching agent.

Certain features or techniques disclosed herein for the purpose of fully illustrating various aspects of the instant invention are also disclosed and claimed per se in my concurrently filed application Ser. No. 576,754, now abandoned and the copending applications Ser. No. 576,724 filed on Sept. 1, 1966 by Griffith et al and Ser. No. 576,753 filed on Sept. 1, 1966 by Mauldin.

Leaching is a method for the purification of crude solid materials of various sizes in which a substantial amount of the impurities associated therewith are removed by dissolving them in an appropriate liquid agent or solvent at a suitable temperature. Some but not all of the substance undergoing purification is usually dissolved also, and this is beneficial in removing part or all of the outer layers of the particles thereby enabling the leaching agent to reach and dissolve foreign matter occluded therein. Although it is an extremely simple operation in theory and in batch operations in the laboratory, many problems are encountered in leaching on a commercial scale, especially in connection with continuous operations. For instance, even minute particles in the slurry tend to settle and plug equipment unless the slurry is subjected to constant agitation; also the liquid component of the slurry is usually a saturated solution which tends to "plate" or form solid deposits on any cold spots in the equipment. The problems are intensified by one or more of such factors as corrosive leaching agents, high concentrations of undissolved solids, high pressures, high temperatures, the treatment of abrasive solids and interruptions in the continuous flow of the slurry through the system.

In the production of polyesters, such as polyethyleneglycol terephthalate, for certain uses as in films, fibers and the base for magnetic sound tapes, polymeric material of extremely high purity is essential in obtaining the necessary physical properties of high tensile strength, dimensional stability, etc. in the final product. In turn, this means that the raw materials employed in preparing the polymers must also have extremely low contents of impurities.

Typical commercial specifications for terephthalic acid require that the content of lower oxidation products therein, be kept below about 300 parts per million (hereinafter ppm.) by weight and there is an increasing demand for a grade of terephthalic acid containing less than 75 ppm. of such impurities of which no more than 50 ppm. may be para-carboxybenzaldehyde. Further, only a very small amount of color body impurities is acceptable for certain uses. Such purity requirements are not easy to meet inasmuch as the crude terephthalic acid crystals separated from the products of the partial oxidation of a relatively pure para-xylene, even under carefully controlled oxidation conditions, frequently contain up to about 5 percent of lower oxidation products, principally p-carboxybenzaldehyde and p-toluic acid. These impurities are difficult to remove since they display a pronounced tendency to be occluded inside the crystals of terephthalic acid.

The novel leaching operation in combination with a recrystallization step is capable of reducing the content of such impurities by at least 65 percent by weight, and when operating under preferred conditions, it is possible to obtain reductions of 80 to 90 percent or more in the case of both p-carboxybenzaldehyde and p-toluic acid; also determinations by the American Public Health Association method in both sulfuric acid and dimethylformamide indicate very sizable decreases in the content of color body impurities. Still higher degrees of purification are obtainable by subjecting the recrystallized product to repetitions of this process with a fresh solvent medium and/or to other purification techniques which may include sublimation.

The present invention is a purification process for leaching a slurry of relatively small particles of an impure solid benzene carboxylic acid containing an aldehyde in which said particles are suspended in a liquid leaching agent for a sufficient period of time at a leaching temperature sufficiently high for dissolving at least a substantial proportion of the aldehyde associated with said acid while said slurry is continuously passing in turbulent flow, through an elongated confined conduit wherein substantially the entire longitudinal orientation of the bottom of said conduit is within the angle of repose of said particles, and the velocity of said slurry in said conduit is in excess of the horizontal saltation velocity of said slurry measured at room temperature and sufficient to maintain said particles in suspension in said leaching agent.

Other more specific aspects of the invention involve the combination in the aforesaid process of one or more of such features as the longitudinal orientation of the bottom of said conduit within the angle of repose of said solid particles, employing a preferred form of conduit comprising a plurality of substantially horizontal straight tubes disposed at a plurality of elevations and connected in series by curved tubes, heating an initial section of said conduit to temperatures substantially greater than those of the slurry in contact therewith to raise the temperature of said slurry to said leaching temperature while heating the remainder of said conduit to a temperature not substantially exceeding the leaching temperature but sufficient to maintain a substantially constant slurry leaching temperature, the treatment of impure benzene carboxylic acids and especially terephthalic acid contaminated with small proportions of p-carboxylic benzaldehyde and p-toluic acid, as well as preferred leaching conditions for terephthalic acid which include the proportion of the charge dissolved in leaching, the concentration of undissolved terephthalic acid in the leach slurry, selected solvents, temperatures and residence times.

Still other features of this invention, as well as various benefits and advantages thereof will be apparent to those skilled in the art from the general and detailed disclosure hereinafter.

The present leaching method involves a partial dissolving of the material to be purified and solid particles are always present in the leaching mixture. It is concerned with the leaching of slurries flowing with turbulence in an approximately horizontal direction through an elongated, confined conduit or channel during leaching at a velocity above the saltation velocity of the material suspended in the slurry.

The saltation velocity is the maximum linear velocity of flow at which particles in any given slurry settle onto the bottom of the conduit through which the slurry is passing. It is dependent upon a great many factors including the orientation and cross-sectional area of the conduit, the density and viscosity of the liquid medium, as well as the size, density and shape of the particles in suspension. In a dynamic system like the present one, a number of these characteristics are affected differently by changes in temperatures and it is impractical to attempt to compute the saltation velocity by mathematical methods because of such complex interrelationships as well as the difficulty or impossibility of determining accurate values for all variable factors under actual operating conditions. Saltation velocities are generally well up in the turbulent flow range, that is, substantially above the critical velocity where streamline or laminar flow changes to turbulent flow, but it does not appear to be feasible to correlate the saltation velocity with the critical velocity as such a correlation would ignore the significant effect of the characteristics of the suspended particles. Accordingly, the recommended method of determining the saltation velocity is by actual trial. In the case of a 15 percent slurry containing 15 parts by weight of undissolved terephthalic acid in 85 parts of acetic acid at room temperature, it has been found that the saltation velocities are 1.8 feet per second fps.) for a horizontal tube of 3-inches internal diameter and 2.0 fps. for a 4-inch tube.

With all other conditions constant for any given slurry in a conduit of uniform size, the saltation velocity is at its maximum in horizontal flow and at its minimum in vertically upward flow, and, of course, this velocity has no significance in downward flow in a vertical direction. For the present purposes the linear flow velocity through the preheating and equilibrium sections of the leaching conduit is desirably based on the horizontal saltation velocity of the slurry at room temperature plus a reasonable safety factor (e.g., a 50 percent or more increase in velocity) to allow for the effects of the usually elevated leaching temperature and variations in operating conditions. Such a linear velocity will also eliminate settling of the solid particles in inclined and vertical conduits or sections thereof.

In conventional plant practice, it is seldom, if ever, desirable to attempt to heat an extremely long straight conduit having a length running into hundreds of feet or to maintain it at an elevated temperature. Instead, for installation in furnaces or ovens of practical dimensions, such long pipes or tubes are usually formed into coils. The latter term is used loosely herein to encompass various known piping arrangements for fitting a long pipe course compactly into a furnace of moderate size, thus, the coil may comprise a plurality of horizontal pipe runs disposed in adjacent stacks or tiers and connected by suitable return bends to form a single conduit as well as continuous tubing wound into a helical coil of shallow pitch.

For a compact piping arrangement which is also economical to heat, either some or all of the pipe sections are desirably inclined. In a preferred embodiment of the invention, the longitudinal angles of inclination of the bottoms of these inclined conduit sections relative to the horizontal are smaller than the angle of repose of the particulate material being charged for leaching. The angle of repose is the minimum slope angle at which the solid particles first begin to tumble or slide down an inclined surface. This angle is generally substantially the same for dry particles as for settled particles lying beneath the surface of a liquid provided that the material and the distribution of particle sizes are the same.

The angle of repose for any selected solid material in particle form may be readily determined by the simple method of placing a layer of the solid material about one-quarter to one-half inch thick on the upper face of a small flat metal plate, raising one edge of the plate slowly and steadily to tilt the plate slowly through gradually increasing angles of inclination until a substantial number of particles begin to slide, roll or tumble down the plate, and then obtaining the angle of repose by measuring the inclination of the plate to the horizontal. If so desired, the determination may also be made in the wet conditions by similarly slowly tilting a wide glass vessel having a similar layer of settled particles on a flat bottom of substantial area covered with a quiescent body of the leaching agent of substantial depth.

The angle of repose is particularly significant here in respect to restarting the leaching operation after an emergency shutdown. When the flow of slurry through the leach coil is stopped, the particles of solid material in the slurry in the coil which were previously maintained in suspension by the velocity and turbulence of the flow now begin to settle to the bottom along the entire piping course. This sediment is evenly distributed along the full length of all horizontal sections of the pipe or tubing and the same is true along conduit sections which are inclined at less than the angle of repose. If a heated pipe coil is allowed to cool through a substantial temperature differential, there will be some additional sedimentation resulting from the precipitation of dissolved solids, and this also will be evenly distributed along the bottom of the entire length of the piping. The settled particles only occupy a small part (e.g., about 2 to 30 percent) of the cross-sectional area of the conduit and the full cross section of the pipe is not plugged with solids in any location.

However, the distribution of the sediment differs considerably in the case of pipe courses containing sections inclined at an angle steeper than the angle of repose, as exemplified by coils composed of a series of vertical pipes and by coils with horizontal pipes connected by U-bends aligned in a vertical plane. In these instances, the settling particles tend to slide or tumble down to the lowest points of each U-bend and each vertical pipe to form thick accumulations of solids which are likely to block the entire cross section of the pipe and prevent flow therethrough when a subsequent attempt is made to resume normal operations.

In contrast, it is a simple matter to start pumping more slurry through a piping arrangement of horizontal or shallow inclination after a shutdown inasmuch as the upper two-thirds or more of the pipe cross section is free for the passage of slurry. When heating and pumping are both resumed, some of the precipitated material is dissolved and the fresh turbulent stream of slurry quickly begins to pick up and transport the accumulation of solids lying on the bottom of the conduit.

Crude terephthalic acid crystals of the type described herein have an angle of repose of about 42°, and in leaching this material, it is recommended that all sections of the leach piping be oriented so that no angle of inclination exceeds about 35° to facilitate restarting after a halt in the leaching operation.

Although the instant leaching process is described in considerable detail hereinafter in connection with the purification of the commercially important terephthalic acid using acetic acid as the preferred solvent medium, it is to be understood that the new method is applicable to the treatment not only of other benzene carboxylic acids, including benzoic, orthophthalic, isophthalic and the isomeric toluic acids, but also of soluble solid substances in general in appropriate solvent liquids at suitable temperature levels for purifying the crude material. The choice of the solvent will, of course, depend upon the solubility characteristics of the substance being treated and of any foreign matter to be removed therefrom, and the selected solvent in turn will largely determine the optimum leaching and recrystallization temperatures.

A solvent medium employed for leaching and recrystallization is desirably one in which there is a marked difference in solubility of the material undergoing purification, for example, a three-fold or six-fold change in solubility over a reasonably small temperature differential of 100° or 200° F. For convenience and economy, this temperature differential should preferably be within a moderately elevated range of temperatures. For instance, operations which require either artificial refrigeration for recrystallization or high temperatures above about 600° F. for leaching are not generally desirable. Since leaching is a liquid phase operation, the critical temperature of the solvent must be above its effective leaching temperature.

The proportions of solvent and solid material in the charge mixture are determined by the operating conditions within the leaching system wherein the slurry usually contains the crystalline substance in two states, namely, as the solute of a solution saturated therewith and as undissolved solid particles or crystals suspended in that solution. The presence of undissolved material at all times in the leach slurry eliminates any possibility of forming a supersaturated solution which might interfere with the subsequent recrystallization operation. Therefore, the charge mixture usually contains an excess of the crude substance over the amount which will dissolve in the solvent medium at the leaching temperature. However, there cannot be an unlimited excess of undissolved crystals present in the system for the slurries must be fluid enough to be pumped. In addition, there are indications that a higher degree of purification is obtainable with less concentrated slurries, but this must be balanced against the extra cost of handling a larger volume of slurry. In any event, the solvent should be present in sufficient amount to dissolve any free or unoccluded foreign matter which is to be removed. As an illustration, the slurry may usually contain about 2 to 32 percent undissolved solids based on the total slurry weight, and this corresponds generally to a total concentration of about 3 to 40 percent (preferably about 8 to 35 percent) of the crystalline material in the mixture when leaching terephthalic acid in acetic acid.

In the case of terephthalic acid, acetic acid is the preferred solvent, especially when the acetic acid has a small content of water, since an aqueous acetic acid is the predominant component of the liquid reaction medium in several types of oxidation processes and acetic acid is in fact generated or formed during the reaction when methyl ethyl ketone is present. Accordingly, the use of acetic acid as the leaching and recrystallization solvent simplifies the manufacture of terephthalic acid in regard to the number of agents employed, recovered and stored in carrying out the complete manufacturing process. Suitable solvents also include the other lower aliphatic monocarboxylic acids containing two to eight carbon atoms as exemplified by propionic, normal butyric, isobutyric, valeric, trimethylacetic, caproic and caprylic acids as well as water, para and other xylenes, N,N-dimethylformamide, N,N-dimethylacetamide, tetrahydrofuran and ketones, such as methyl ethyl ketone and methyl isobutyl ketone. All of these also possess the necessary characteristics of being inert so that they do not react with terephthalic acid, even at high temperatures.

Acetic acid has especially suitable solvent properties inasmuch as the solubility of the terephthalic acid therein is relatively low up to about 375° F. but thereafter increases rapidly so that terephthalic acid is moderately soluble at temperatures in the preferred leaching range of about 420° to 580° F. The undesired lower oxidation products all are far more soluble therein at the leaching and recrystallization temperatures described herein, also their concentrations in a fresh leach slurry are much lower than in the oxidation reaction slurry; accordingly such impurities which are in the free or unoccluded state during leaching (i.e., exposed to the leaching solvent) dissolve during leaching, and predominant proportions thereof are retained in solution when the terephthalic acid is subsequently recrystallized.

The novel method is concerned only with slurry leaching wherein the solids undergoing treatment are only partially dissolved, e.g., by dissolving about 10 to 70 percent by weight thereof, in contrast with a recrystallization operation in which the crude crystalline material is first dissolved completely except for any insoluble impurities present and then recrystallized at a lower temperature, for the turbulent flow technique produces no significant benefits in the latter type of process. With a slurry of the type under consideration which contains a substantial excess of undissolved solid particles suspended in a saturated leaching solution, initially there is essentially only a dissolving action for a relatively brief period as more solid material goes into solution while the slurry temperature gradually rises to the leaching temperature as the slurry flows through a heater coil, then there is an equilibrium or "soaking" action usually for a considerably longer interval in a soaking coil between crystalline material dissolving and solute recrystallizing at the substantially steady leaching temperature with a consequent breaking down of the structure of the original crystals and a reconstitution thereof accompanied by a release of much or all of the foreign matter in the original crystals. In the treatment of terephthalic acid, the p-carboxybenzaldehyde and p-toluic acid impurities are more soluble than terephthalic acid in the hot acetic acid, and they are also present in much lower concentration in the slurry; hence, there is less tendency for them to be occluded again during subsequent recrystallization of the terephthalic acid.

The optimum residence time in the leaching operation is dependent upon a number of factors including the compositions of both the material undergoing purification and the leaching agent, the particle size and solubility of the solid material, the leaching temperature and probably the concentration of solids. Upon increasing the leaching temperature (not beyond the critical temperature of the solvent medium as a liquid phase is essential here), the residence time may be decreased and vice-versa. For the present purposes, leaching residence time includes both the preheating and equilibrium (soaking) periods for leaching occurs during both of these steps and ordinarily the preheating is carried out as quickly as may be feasible. In general, the leaching residence time should amount to at least one minute and a longer period is often desirable.

The pressure in leaching is apparently relatively unimportant except that it should be adequate to preclude any substantial vaporization of the liquid phase of the slurry at the selected leaching temperature.

Any type of reprecipitation or recrystallization may be utilized in conjunction with the leaching operation. Crystallization is conventionally carried out at ambient or relatively low temperatures for convenience in separating the product and obtaining the maximum yield but relatively high temperatures are preferred for use with certain applications of the instant leaching method as described hereinafter. In general, the crystallizing temperature should be at least about 50° F. below the leaching temperature; further, it usually should be low enough to recrystallize at least about 60 weight percent of the dissolved solute, but preferably not more than about 95 percent thereof in order to minimize the occlusion of impurities during recrystallization.

The optimum residence time for recrystallization is dependent essentially on the factors named earlier as influencing the leaching residence time. In general, the residence time at the recrystallization temperature should be at least one minute and considerably longer periods are often preferred for obtaining a recrystallized product of higher purity.

Numerous benefits and advantages are obtainable with the present invention, particularly in minimizing or avoiding the use of mechanical agitation in the conventional manner for preventing the settling of particles of slurry. The agitating devices customarily employed in leaching vessels are a continuing source of difficulties due to the problems of maintaining seals or packing glands around agitator shafts fluid-tight, especially under severe operating conditions involving high temperatures and high pressures in the presence of abrasive solids suspended in corrosive liquids. In contrast, the instant leaching process requires no agitator for either the preheating or equilibrium leaching stages and the relatively high turbulent flow velocities utilized here also improve the heating efficiency. The accumulation of solids from leaching slurries on equipment surfaces is minimized or eliminated by means including the orientation of such surfaces and the elimination of cold spots or surfaces in contact with the slurry. Such factors, as well as the overall simplicity of the novel method, substantially reduce maintenance problems and shutdowns in operations of this type. Moreover, as described earlier, it is a simple matter to resume leaching after an unexpected shutdown without the laborious cleaning of equipment often required in other leaching systems.

For a better understanding of the nature and objects of this invention, reference should be had to the accompanying drawing and the detailed disclosure hereinafter in which all proportions are expressed in terms of weight and all temperatures as degrees Fahrenheit unless otherwise stated.

The FIGURE is a flow sheet of one embodiment of a continuous purification process employing the turbulent flow leaching of the present invention. The drawing is schematic in nature and many conventional accessories in the form of valves, control instruments and other auxiliary equipment have been omitted for greater clarity inasmuch as such devices and their utilization are well known to those skilled in the art.

Referring to the drawing, a crude filter cake of terephthalic acid crystals is charged along with acetic acid to a crude slurry tank 10 wherein the rotating agitator 12 driven by a suitable motor 14 repulps the solids to form a relatively uniform dispersion of about 8 to 20 percent of the terephthalic acid (e.g., 15 percent of the total slurry weight) in the liquid. The crude terephthalic acid may be obtained from any suitable source, such as the oxidation of p-xylene according to the procedure disclosed in Ardis et al., U.S. Pat. No. 3,036,122. This crude cake often contains 10 to 20 percent weight of reaction mother liquor consisting mainly of acetic acid, and its approximate dry composition is typically 98 percent terephthalic acid with 1 percent p-carboxybenzaldehyde and 1 percent p-toluic acid as the principal impurities. The leaching solvent is desirably acetic acid containing about 1 to 4 percent water by weight, and it may be recovered from the aforesaid oxidation process and the instant leaching process by a distillation operation (not shown).

The resulting slurry is withdrawn from the bottom of tank 10 in the transfer line 16 and forced by a multistage, slurry pump assembly 18 at high pressure through the pipe 20 into leach slurry preheater 22 equipped with a 750-foot long continuous coil 24 of 3-inch I.D. tubing. By the combustion of fuel gas in furnace 22, the slurry charge in coil 24 is heated from ambient or a slightly elevated temperature of perhaps 145° to a temperature of 420° before the slurry enters the leach soaking oven 26.

Leach soaking coil 28 is connected to preheating coil 24 by a short tubing section 30 which is surrounded by a jacket (not shown) heated by flue gas from furnace 22 to preclude any chilling of the slurry between the two coils. The slurry is maintained at 420° or slightly higher at all times without any decrease in temperature while flowing through the 2,630-foot length of 3-inch I.D. tubing in coil 28. This is accomplished by locating the coil 28 inside the inner compartment 32 which in turn is set within the outer casing 34 of the leach soaking oven 26 and then passing a mixture of flue gas and air at 600° through the open space between the walls of chambers 32 and 34. The flue gas is obtained by diverting a portion of the stack gases from stack 36 of the preheating furnace 22 through a branch flue 38 under the control of a damper 40 into the duct 42 leading to the soaking unit 26. Ambient air is introduced into this system through the open end of conduit 44 at a rate regulated by the damper 46 and then blended in duct 42 with the flue gas to moderate the temperature of the latter in order to provide gentle heating for the soaking oven 26. After flowing around the exterior of the inner compartment 32, the heating gases are drawn into the stack 48 by a squirrel cage exhaust blower 50 driven by a motor 52 to provide the necessary induced draft through this oven.

The showing of the pipe coils is of a schematic nature as each coil is made up of two parallel stacks or tiers of horizontal tubes connected by return bends. Thus, in coil 24, the top horizontal tube 54 of the first stack is connected by the sloping return bend 56 to the top horizontal tube 58 at a somewhat lower level in the second stack, and the other end of tube 58 is connected by the downwardly slanted return bend 60 to the next lower horizontal tube 62 of the first stack and so forth. All of the tubing elements of the single coil 24 are either disposed horizontally or in the case of return bends 56 and 60 oriented in relatively shallow inclined planes for directing the slurry stream downward to the next lower horizontal tubing run in the adjacent tier.

The construction of the coil 28 is similar with the horizontal tube 64 at the top of the first tier connected by a slanted return bend 66 to the somewhat lower horizontal tube 68 at the top of the second tier and the opposite end of tube 68 is connected by a sloping U-bend 70 to the next lower tube 72 in the first stack, etc.

The lower or bottom side of each of the alternating return bends 56 and 60 at opposite ends of coil 24 and similarly the bends 66 and 70 at the ends of coil 28 lie in planes which are inclined at relatively shallow angles to the horizontal of 26° for coil 24 and 6° for coil 28. These angles are substantially smaller than the 42° angle of repose of terephthalic acid particles of the type involved here; hence, in the event of a sudden cessation of the flow of slurry, the solid particles merely settle to the bottom throughout the return bends without sliding downward to the lowest point of each bend to pile up in large deposits and block the entire pipe.

Alternatively, the pipe coils 24 and 28 may be constructed as helical coils with a constant slope of up to 35° along the convolutions thereof. While simpler in shape than return bend type described earlier, helical coils of large diameter are more difficult to fabricate. Moreover, in event of blockage, it is far more difficult to locate and remove the deposited solids in a helical coil than in a coil composed of straight tubes connected by return bends where the removal of a single return bend permits the ready inspection and relatively easy cleaning of two long straight tubes as well as the disconnected bend. Accordingly, the latter construction is preferred.

Settling of the suspended particles and accumulation of solid deposits on the bottom of the pipe coils, especially at the return bends, during normal operations is prevented by maintaining turbulent flow of adequate velocity through the coils. For example, an initial velocity of about 4.2 feet per second is suitable for the 15 percent slurry of terephthalic acid in acetic acid and the velocity increases substantially in preheating coil 24 as the slurry expands considerably as its temperature rises. Even the initial velocity is substantially higher than the horizontal saltation velocity (1.8 fps. at room temperature) and also far above the critical velocity which divides turbulent flow from the slower streamline flow.

This leaching operation is of relatively short duration for the total residence time in the coils 24 and 28 is only about 9.4 minutes.

Coils 24 and 28, as well as other apparatus elements described herein as exposed to acetic or similar acids at temperatures above about 300° are preferably constructed of titanium or clad or lined with this metal or other material of similar corrosion and heat resistance in order to avoid contaminating the product with corrosion products. At temperatures below 300°, a chromium-nickel stainless steel of the 18–8 type may be used as it provides suitable corrosion resistance at a lower equipment cost.

Since the leaching temperature is well above the atmospheric boiling point of acetic acid, the coils 24 and 28 are maintained under an internal pressure of about 300 or more psig. to prevent boiling of the slurry, and the same is true of the adjoining crystallization section.

The leach slurry leaving coil 28 at 420° is delivered by the short conduit 74, which is jacketed and heated to prevent chilling and consequent deposition of solids therein, to the crystallizing system where it joins a flow of recrystallizing slurry of 70 times its volume in line 76. This system comprises a high capacity circulating pump 78 of an axial flow propeller-type suitable for handling such slurries, a cooler 80 and a crystallizing vessel 82 provided with a suitable agitator 84 driven by a motor 86 plus the necessary transfer lines. Continual recirculation of a large proportion of the slurry in the crystallizing system along with the repeated alternate heating and cooling of the circulating slurry in different zones serves here to partially dissolve and partially recrystallize the terephthalic acid in recurring cycles.

A large flow of recrystallizing slurry at 325° is drawn out of the vessel 82 in the bottom line 76 where it is joined by a considerably smaller flow of the hotter leached slurry. Such mixing quickly cools the slurry from line 74 and recrystallizes a major proportion of its dissolved terephthalic acid while the average temperature of the stream in line 76 is increased 1.3° F. to about 326°, thereby redissolving a small proportion of the large mass of crystals in the slurry flowing out of the bottom of crystallizer 82. Pump 78 then forces the mixed slurries through the pipe 88 into the shell-and-tube heat exchanger 80 in which the temperature of the stream is reduced 1.3° by indirect heat exchange with a suitable fluid cooling medium admitted from supply line 90 and leaving in pipe 92. To avoid a sudden chilling of the slurry in contact with the heat exchange surfaces and consequent rapid fouling thereof with crystalline deposits, a "tempered" coolant is desirably introduced into the cooler at a temperature about 25° to 50° below the temperature of the circulating slurry; a boiling water coolant under suitable pressure is preferred for the purpose.

This cooling recrystallizes only a small proportion of the dissolved terephthalic acid. The cooled slurry stream exits in pipe 94 and then divides between the return line 96 and the discharge conduit 98 in a volumetric ratio of about 70:1. Return line 96 carries the large flow of the mixture back to the crystallizing vessel 82 and a much smaller flow of the recrystallized slurry is taken off in pipe 98 for further processing, as exemplified by separation of the leached and recrystallized product from the slurry by filtration and subsequent purification by means which may include sublimation if a product of extremely high purity is desired. It will be appreciated that the rate of withdrawing the recrystallized slurry in line 98 corresponds on a weight basis to the rate of introducing leached slurry from coil 28 into the crystallizing system and likewise to the rate of charging slurry in line 20 to the leaching system.

Most of terephthalic acid in solution at 420° in the slurry entering the crystallization system is rapidly crystallized since its solubility at 325° is relatively low; then it is repeatedly subjected to further solution and recrystallization while in the crystallizing loop. Excellent results are obtainable with an average residence time in the crystallizing loop of 22 minutes and a slurry recirculation flow rate providing a frequency of 3.2 of heating-cooling cycles per minute which subjects the slurry to an average of 71 cycles of dissolving and recrystallizing.

Although only a small proportion of the dissolved terephthalic acid in the total recirculating stream is recrystallized and redissolved in each complete cycle through the crystallizing system, nevertheless the flow rate is so high that individual crystalline aggregates or crystals of terephthalic acid are repeatedly partially dissolved and then built up by recrystallization.

Although other temperatures may be utilized here in treating terephthalic acid with acetic acid, it is generally preferable to adopt the technique of the aforesaid application Ser. No. 576,724 of recrystallizing terephthalic acid from the hot leach slurry in one or more stages at relatively high intermediate temperatures (e.g., 285° to 420°) at least about 50° below those employed for leaching (e.g., 400° to 580°) and substantially higher than the subsequent filtration temperature (e.g., 180°– 220°) to obtain terephthalic acid crystals containing considerably less of the impurities than when the leach slurry is cooled directly to a temperature suitable for filtering or otherwise separating these crystals from the slurry. Subsequent cooling of a slurry recrystallized at the elevated intermediate temperature to the same separation temperature (e.g., 180°) apparently does not significantly reduce the purity of the crystals.

While the leaching process of the present invention has been described in detail with reference to the purification of a single compound with a single leaching solvent under specific conditions in a single system, it will be apparent to those skilled in the art that there are many other possible modifications of the novel method which may involve the leaching or purification of other solid or crystalline substances of a soluble nature, the use of different solvents, other leaching temperature levels, different types of apparatus, etc. Accordingly, this invention should not be construed as limited in any particulars except as set forth in the appended claims or required by the prior art.

What is claimed is:

1. A process for the purification of an impure solid benzene carboxylic acid containing an aldehyde which comprises leaching a slurry of relatively small particles of said impure acid suspended in a liquid leaching agent for a sufficient period of time at a leaching temperature sufficiently high for dissolving at least a substantial proportion of said aldehyde while said slurry is continuously passing in turbulent flow through an elongated, confined conduit wherein substantially the entire longitudinal orientation of the bottom of said conduit is within the angle of repose of said particles, and the velocity of said slurry in said conduit is in excess of the horizontal saltation velocity of said slurry measured at room temperature and sufficient to maintain said particles in suspension in said leaching agent.

2. A process according to claim 1 in which the flow of said slurry is through a plurality of substantially horizontal straight tubes disposed at a plurality of levels and connected in series by curved tubes, and the longitudinal orientation of the bottoms of said straight and curved tubes is within the angle of repose of said solid particles.

3. A process according to claim 1 in which an initial section of said conduit is heated to temperatures substantially greater than those of said slurry in contact therewith to raise the temperature of said slurry to said leaching temperature and the remainder of said conduit is heated to a temperature not substantially exceeding said leaching temperature but sufficient to maintain a substantially constant leaching temperature within said slurry.

4. A process according to claim 3 in which the flow of said slurry is through a plurality of substantially horizontal straight tubes disposed at a plurality of levels and connected in series by curved tubes, and the longitudinal orientation of the bottoms of said straight and curved tubes is within the angle of repose of said solid particles.

5. A process according to claim 1 in which said acid is impure terephthalic acid.

6. A process according to claim 1 in which impure terephthalic acid is leached at a temperature between about 400° and 580° F. for a period of at least one minute in a solvent of the group consisting of water, aliphatic monocarboxylic acids containing from two to eight carbon atoms, ketones, xylenes, tetrahydrofuran, N,N-dimethylformamide and N,N-dimethylacetamide.

7. A process according to claim 1 in which said acid is a crude terephthalic acid containing small proportions of p-carboxybenzaldehyde and p-toluic acid, said leaching agent is a suitable solvent for said three compounds, and the quantity of said medium is sufficient to dissolve all free p-carboxybenzaldehyde and p-toluic acid together with between about 10 and 70 percent by weight of the terephthalic acid present.

8. A process according to claim 7 in which an initial section of said conduit is heated to temperatures substantially greater than those of said slurry in contact therewith to raise the temperature of said slurry to said leaching temperature and the remainder of said conduit is heated to a temperature not substantially exceeding said leaching temperature but sufficient to maintain a substantially constant leaching temperature within said slurry.

9. A process according to claim 1 in which impure terephthalic acid is leached in a solvent medium comprising at least a major proportion of acetic acid at a temperature between about 400° and 580° F. for a period of at least one minute as a slurry containing between about 2 and 32 percent undissolved terephthalic acid based on the total slurry weight.

10. A process according to claim 9 in which the flow of said slurry is through a plurality of substantially horizontal straight tubes disposed at a plurality of levels and connected in series by curved tubes, the longitudinal orientation of the bottoms of said straight and curved tubes is within the angle of repose of said solid particles, an initial section of said conduit is heated to temperatures substantially greater than those of said slurry in contact therewith to raise the temperature of said slurry to said leaching temperature and the remainder of said conduit is heated to a temperature not substantially exceeding said leaching temperature but sufficient to maintain a substantially constant leaching temperature within said slurry.

* * * * *